US012624578B2

(12) United States Patent
Sanchez Rojas et al.

(10) Patent No.: US 12,624,578 B2
(45) Date of Patent: May 12, 2026

(54) VEHICLE LATCH WITH CINCHING MECHANISM

(71) Applicant: INTEVA PRODUCTS, LLC, Troy, MI (US)

(72) Inventors: Hector Sanchez Rojas, Chih (MX); Pedro Alfredo Alvarado Heredia, Chih (MX); Jesus Osvaldo Alvarez Morales, Chih (MX); Miguel Angel Baray Gonzalez, Chih (MX); Victor Daniel Varela Antillon, Chih (MX); Yan Lianming, Shanghai (CN); Qu Train, Wuxi (CN)

(73) Assignee: INTEVA PRODUCTS, LLC, Troy, MI (US)

( * ) Notice: Subject to any disclaimer, the term of this patent is extended or adjusted under 35 U.S.C. 154(b) by 391 days.

(21) Appl. No.: 18/141,645

(22) Filed: May 1, 2023

(65) Prior Publication Data

US 2023/0349201 A1 Nov. 2, 2023

(30) Foreign Application Priority Data

Apr. 29, 2022 (CN) ......................... 202210467102.9

(51) Int. Cl.
*E05B 77/00* (2014.01)
*E05B 79/10* (2014.01)
(Continued)

(52) U.S. Cl.
CPC .............. *E05B 77/00* (2013.01); *E05B 79/10* (2013.01); *E05B 85/243* (2013.01); *E05B 85/26* (2013.01)

(58) Field of Classification Search
CPC ........ E05B 85/26; E05B 85/243; E05B 79/10; E05B 77/00
See application file for complete search history.

(56) References Cited

U.S. PATENT DOCUMENTS

| | | | | |
|---|---|---|---|---|
| 6,053,542 A * | 4/2000 | Ostrowski | E05B 79/20 | 292/216 |
| 6,123,372 A * | 9/2000 | Rogers, Jr. | E05B 79/20 | 292/201 |

(Continued)

FOREIGN PATENT DOCUMENTS

| | | |
|---|---|---|
| CN | 108431352 A | 8/2018 |
| CN | 109653617 A | 4/2019 |
| CN | 114059856 A | 2/2022 |

OTHER PUBLICATIONS

CNIPA Notification of the First Office Action corresponding to CN Application No. 202210467102.9; Issue date, Aug. 27, 2025, 10 pages.

*Primary Examiner* — Mark A Williams
(74) *Attorney, Agent, or Firm* — CANTOR COLBURN LLP

(57) ABSTRACT

A vehicle latch (10), including: a cinching mechanism (40) internal to the vehicle latch (10), the cinching mechanism including: a cinching lever (18) operably coupled to an actuator (20) via a cable (30), the cinching lever (18) being rotatably mounted to the latch (10) for movement about a pivot (16), the cinching lever (18) being secured to a cinch blank lever (48), the cinch blank lever (48) being pivotally mounted to a cinch drive link (14) via a pivot (26); a claw (22) pivotally mounted to the latch for movement between an open position and a primary position, the cinch drive link (14) being configured to contact a claw blank (41) of the claw (22) in order to move the claw (22) into the primary position during a cinching operation of the latch (10); a bearing (24) secured to the cinch drive link (14) via a pivot (27), the bearing (24) travels through a canal (9) of an override lever (8) during interaction between the claw blank (41) and the cinch drive link (14); an override clutch lever (12); a pawl release lever (4) operably coupled to a pawl;
(Continued)

and an override clutch link (2) pivotally secured to the override clutch lever (12) and the pawl release lever (4), wherein the override clutch link (2) includes a lateral tab (72) that interacts with a door ajar cam (6) operably coupled to the claw (22) of the latch (10) in order to limit movement of the override clutch lever (12) when the claw (22) the latch (10) is in the open position.

10 Claims, 15 Drawing Sheets

(51) Int. Cl.
*E05B 85/24* (2014.01)
*E05B 85/26* (2014.01)

(56) References Cited

U.S. PATENT DOCUMENTS

| | | | | |
|---|---|---|---|---|
| 6,276,743 | B1 * | 8/2001 | Jyawook | B60J 5/107 49/360 |
| 6,321,488 | B1 * | 11/2001 | Bigoszewski | E05F 15/638 49/362 |
| 11,124,994 | B2 | 9/2021 | Jeong | |
| 11,674,338 | B2 * | 6/2023 | Tomaszewski | E05B 83/36 292/201 |
| 11,692,376 | B2 * | 7/2023 | Jeong | E05B 81/06 292/201 |
| 11,697,952 | B2 * | 7/2023 | Ottino | E05F 1/105 49/139 |
| 11,732,514 | B2 * | 8/2023 | Taurasi | E05B 81/90 292/92 |
| 12,077,995 | B2 | 9/2024 | Ney et al. | |
| 2002/0000725 | A1 * | 1/2002 | Ostrowski | E05B 81/20 292/199 |
| 2005/0121922 | A1 * | 6/2005 | Cetnar | E05B 81/90 292/216 |
| 2016/0362916 | A1 * | 12/2016 | Tomaszewski | E05B 81/06 |
| 2018/0355643 | A1 | 12/2018 | Taurasi | |
| 2018/0371806 | A1 | 12/2018 | Jeong | |
| 2019/0106911 | A1 | 4/2019 | Nishino et al. | |
| 2019/0143796 | A1 * | 5/2019 | Linden | E05F 15/00 49/386 |
| 2020/0024872 | A1 | 1/2020 | Ney et al. | |
| 2022/0042352 | A1 | 2/2022 | Ney et al. | |
| 2023/0258029 | A1 * | 8/2023 | Philippe | E05B 85/103 70/277 |

* cited by examiner

VEHICLE LATCH WITH CINCHING MECHANISM

CROSS REFERENCE TO RELATED APPLICATIONS

This application claims priority under 35 U.S.C. § 119 to the following Chinese Patent Application No. CN 202210467102.9, filed on Apr. 29, 2022, the entire contents of which are incorporated herein by reference thereto.

BACKGROUND

Exemplary embodiments of the present disclosure pertain to the art of vehicle latches.

It is desirable to connect a latch and a remote cinch actuator with a cable to allow a cinching mechanism to draw the door of a vehicle from a secondary position to a primary closed position. However, it is desirable to prevent the latch from performing the cinching function while the door is in an open position as this could potentially create an undesired performance of the latch wherein there is an undesired interaction between a cinch drive link and a claw of the latch. As such, it is desirable to prevent the cinch drive link from contacting the claw when the latch is cinching when the open position in order to avoid the aforementioned undesired interaction between the cinch drive link and the claw.

BRIEF DESCRIPTION

Disclosed is a vehicle latch, including: a cinching mechanism internal to the vehicle latch, the cinching mechanism including: a cinching lever operably coupled to an actuator via a cable, the cinching lever being rotatably mounted to the latch for movement about a pivot, the cinching lever being secured to a cinch blank lever, the cinch blank lever being pivotally mounted to a cinch drive link via a pivot; a claw pivotally mounted to the latch for movement between an open position and a primary position, the cinch drive link being configured to contact a claw blank of the claw in order to move the claw into the primary position during a cinching operation of the latch; a bearing secured to the cinch drive link via a pivot, the bearing travels through a canal of an override lever during interaction between the claw blank and the cinch drive link; an override clutch lever; a pawl release lever operably coupled to a pawl; and an override clutch link pivotally secured to the override clutch lever and the pawl release lever, wherein the override clutch link includes a lateral tab that interacts with a door ajar cam operably coupled to the claw of the latch in order to limit movement of the override clutch lever when the claw the latch is in the open position.

In addition to one or more of the features described above, or as an alternative to any of the foregoing embodiments, the override clutch link includes a post that interacts with the cinching lever and provides restraint on the override clutch lever when the latch is in the open position.

In addition to one or more of the features described above, or as an alternative to any of the foregoing embodiments, the override clutch link allows the override clutch lever to return to a rest position when the claw of the latch is in a secondary position.

In addition to one or more of the features described above, or as an alternative to any of the foregoing embodiments, the post contacts a retention feature of the cinching lever when the claw of the latch is in an open position.

In addition to one or more of the features described above, or as an alternative to any of the foregoing embodiments, the override lever contacts the override clutch lever when the claw is in a secondary position and the cinching lever is rotated by the actuator.

In addition to one or more of the features described above, or as an alternative to any of the foregoing embodiments, the override clutch link includes a post that interacts with the cinching lever and provides restraint on the override clutch lever when the latch is in the open position.

In addition to one or more of the features described above, or as an alternative to any of the foregoing embodiments, the post contacts a retention feature of the cinching lever when the claw of the latch is in an open position.

In addition to one or more of the features described above, or as an alternative to any of the foregoing embodiments, the override clutch link allows the override clutch lever to return to a rest position when the claw of the latch is in a secondary position.

In addition to one or more of the features described above, or as an alternative to any of the foregoing embodiments, the override clutch link allows the override clutch lever to return to a rest position when the claw of the latch is in a secondary position.

In addition to one or more of the features described above, or as an alternative to any of the foregoing embodiments, the bearing is rotatably secured to the pivot.

Also disclosed is a method of preventing an override lever of a vehicle latch from contacting an override clutch lever during a cinching operation of the vehicle latch when a claw of the vehicle latch is in an open position, including: pivotally securing an override clutch link to the override clutch lever and a pawl release lever of the vehicle latch, wherein the override clutch link includes a lateral tab that interacts with a door ajar cam operably coupled to the claw of the latch in order to limit movement of the override clutch lever when the claw of the latch is in the open position.

In addition to one or more of the features described above, or as an alternative to any of the foregoing embodiments, the override clutch link includes a post that interacts with a cinching lever operably coupled to an actuator of the vehicle latch via a cable, the cinching lever and provides restraint on the override clutch lever when the latch is in the open position.

In addition to one or more of the features described above, or as an alternative to any of the foregoing embodiments, the override clutch link allows the override clutch lever to return to a rest position when the claw of the latch is in a secondary position.

In addition to one or more of the features described above, or as an alternative to any of the foregoing embodiments, the post contacts a retention feature of the cinching lever when the claw of the latch is in an open position.

In addition to one or more of the features described above, or as an alternative to any of the foregoing embodiments, the override lever contacts the override clutch lever when the claw is in a secondary position and the cinching lever is rotated by the actuator.

DETAILED DESCRIPTION

Figure 1:
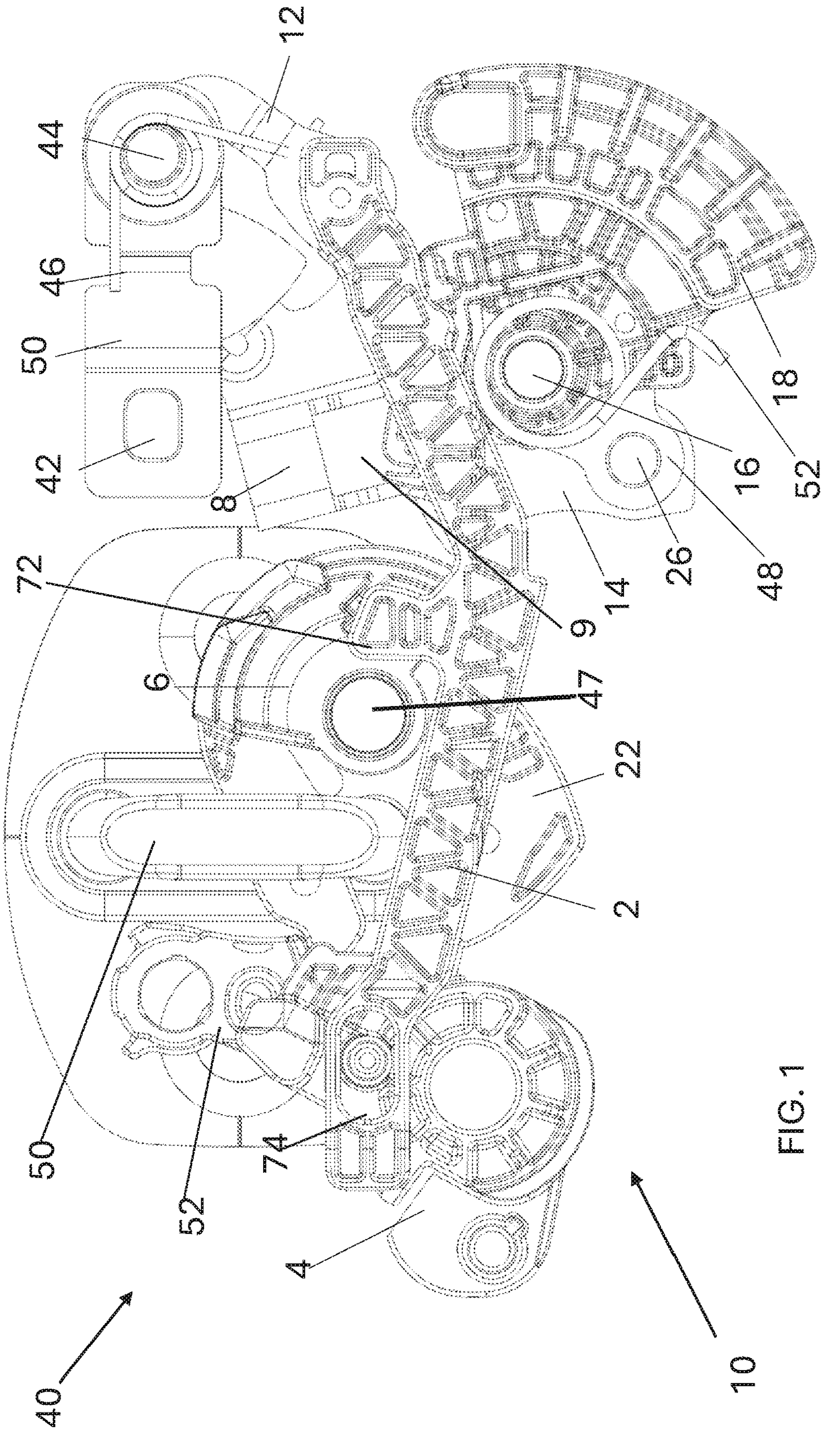
FIG. 1 is a view of an internal cinching mechanism in accordance with the present disclosure.

A detailed description of one or more embodiments of the disclosed apparatus and method are presented herein by way of exemplification and not limitation with reference to the attached Figures.

Disclosed herein is an internal cinching mechanism 40 for use with a vehicle latch 10 operably coupled to a remote cinching actuator 20. In one non-limiting embodiment, the vehicle latch 10 is configured for use with a side door of a vehicle. The internal cinching mechanism 40 includes an overmolded cinching lever 18 joined by a cable 30 to the remote cinching actuator 20. The overmolded cinching lever 18 includes a cinch blank lever 48 that moves a cinch drive link 14, also attached to a bearing 24 that will rotate freely in a pivot 27 that will travel through a canal 9 of a cinch override lever 8 to allow the interaction of the cinch drive link 14 and a claw 22 so that the claw 22 can rotate on its pivot 47 from a secondary to a primary position during a cinching operation. The cinch override function is, therefore, a means to cease the cinching operation at any time of the cinching travel and upon vehicle battery loss and is comprised of a cinch override lever 8 that interacts with a cinch override clutch lever 12, coupled to a cinch override link 2 which is also joined to a pawl release lever 4, therefore permitting the detachment of the cinch drive link 14 from the latch claw 22.

As used herein and as known in the related arts, the primary position refers to a closed position of the latch 10 wherein the claw 22 retains a striker 50 and the door the vehicle latch 10 is associated with is fully closed and a pawl 52 is in an engaged position that retains the claw 22 in the closed or primary position. As used herein and as known in the related arts, the open position of the latch 10 refers to a position where the claw 22 no longer retains the striker 50 and the door the vehicle latch is associated with is open or openable and the pawl 52 has been moved to a disengaged position so that the claw 22 can rotate from the closed or primary position to the open position. As used herein and as known in the related arts, the secondary position refers to a partially closed position of the latch 10 wherein the claw 22 retains a striker 50 and the door the vehicle latch is associated with is partially closed and the pawl 52 is in another engaged position that retains the claw 22 in the second position.

The internal cinching mechanism 40 dictates the instances in which the latch 10 shall perform the cinching function through the position of the override clutch lever 12, furthermore, controlled by the cinch override link 2. The cinch override link 2 is enhanced by the addition of a cam 72 for retention and engagement that is in direct contact with a door ajar cam 6 with the purpose of stopping the rotation of the claw 22 from the open position to secondary position (cinching function) at undesired times. Moreover, the cinch override link 2 also includes a post 70 in a bottom area that interacts with the overmolded cinching lever 18. The overmolded cinching lever 18 includes a retention feature 76 on its upper area to maintain its engagement with the cinch override link 2 and guarantee that the cinch override link 2 can return to its rest position, to allow a bite 23 between the cinch override lever 8 and override clutch lever 12 during the secondary position.

Figure 7:
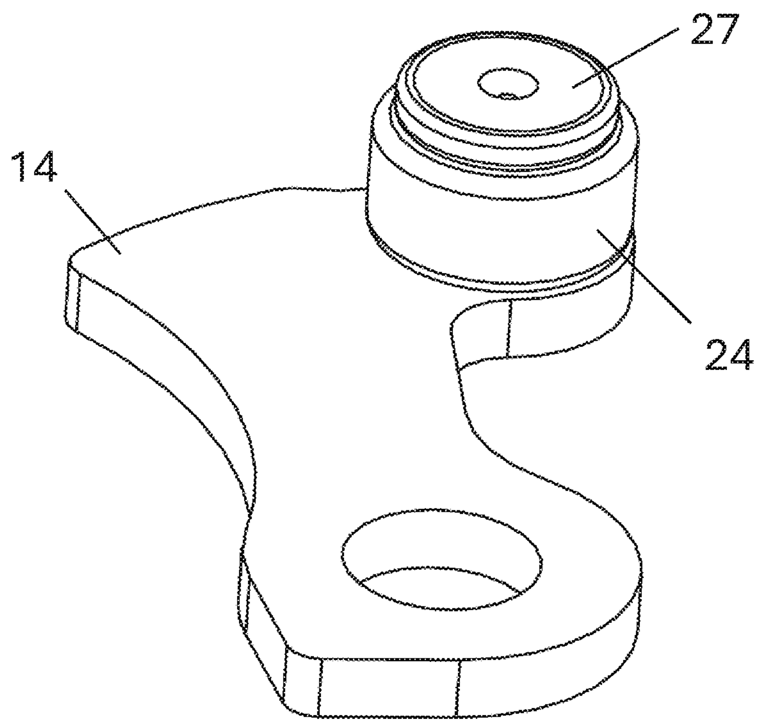
FIG. 7 is a perspective view of a bearing and cinch drive link pivot assembled into the cinch drive link.
Figure 8:
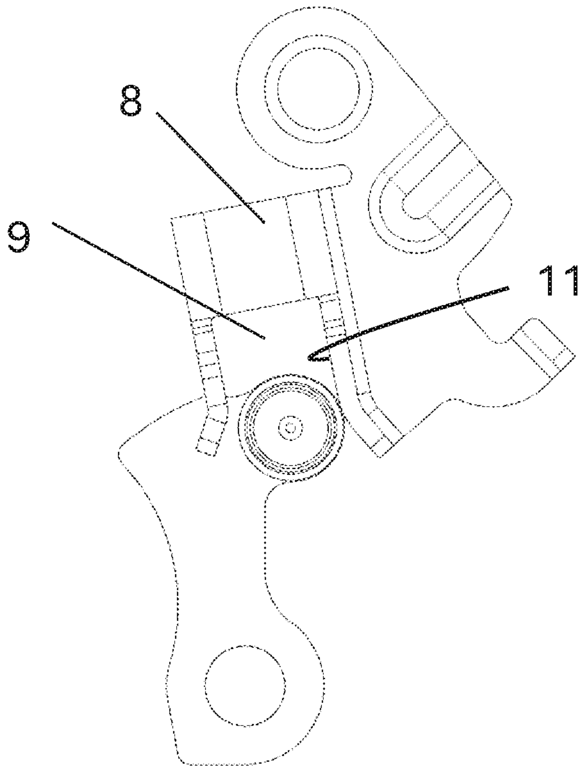
FIG. 8 illustrates the override lever and a cinch drive link of the internal cinching mechanism in accordance with the present disclosure.
Figure 9:
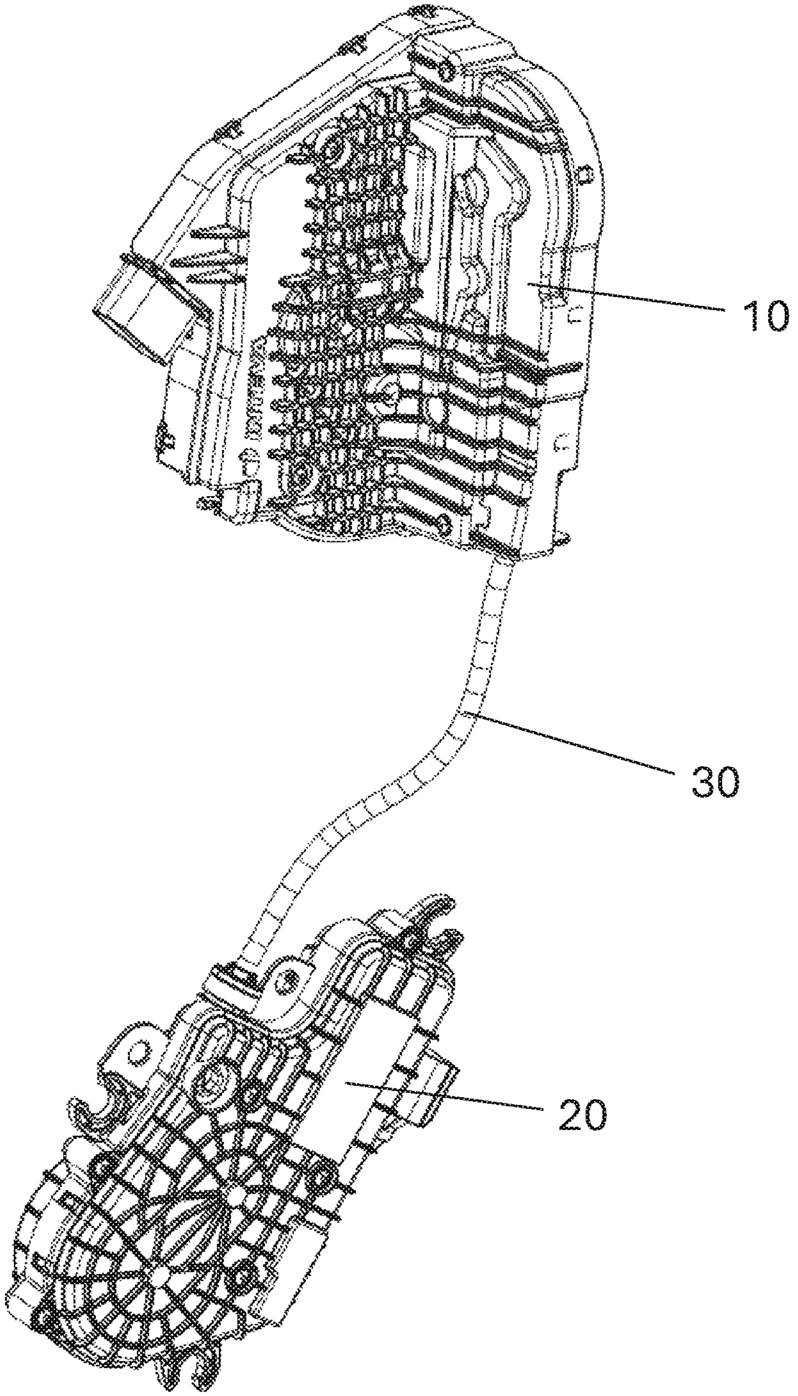
FIG. 9 is a perspective view illustrating the latch with a remote cinching actuator and its cable.
Figure 10:
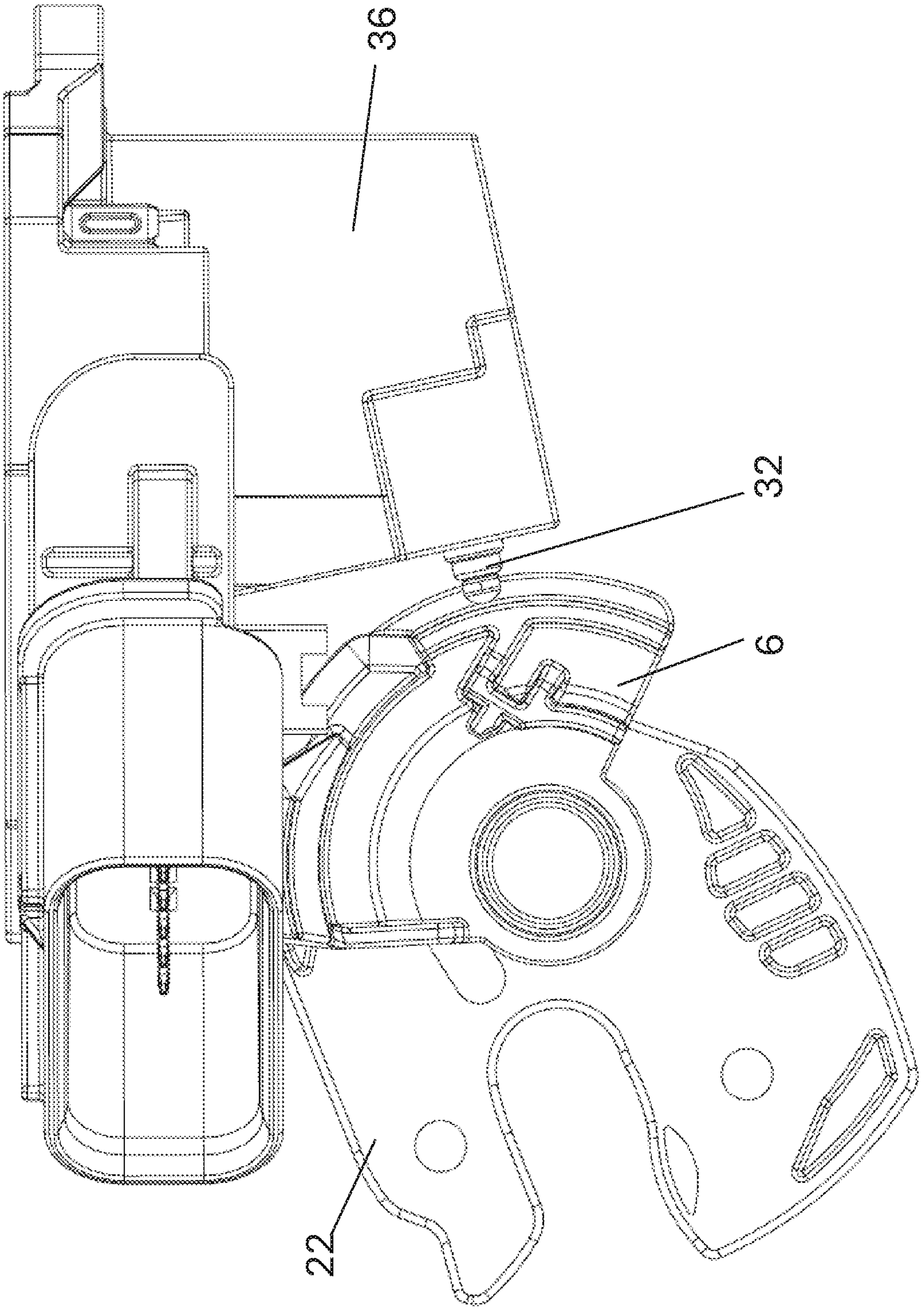
FIG. 10 illustrate the cam door ajar switch assembled into an electric circuit carrier (ECC)
Figure 11:
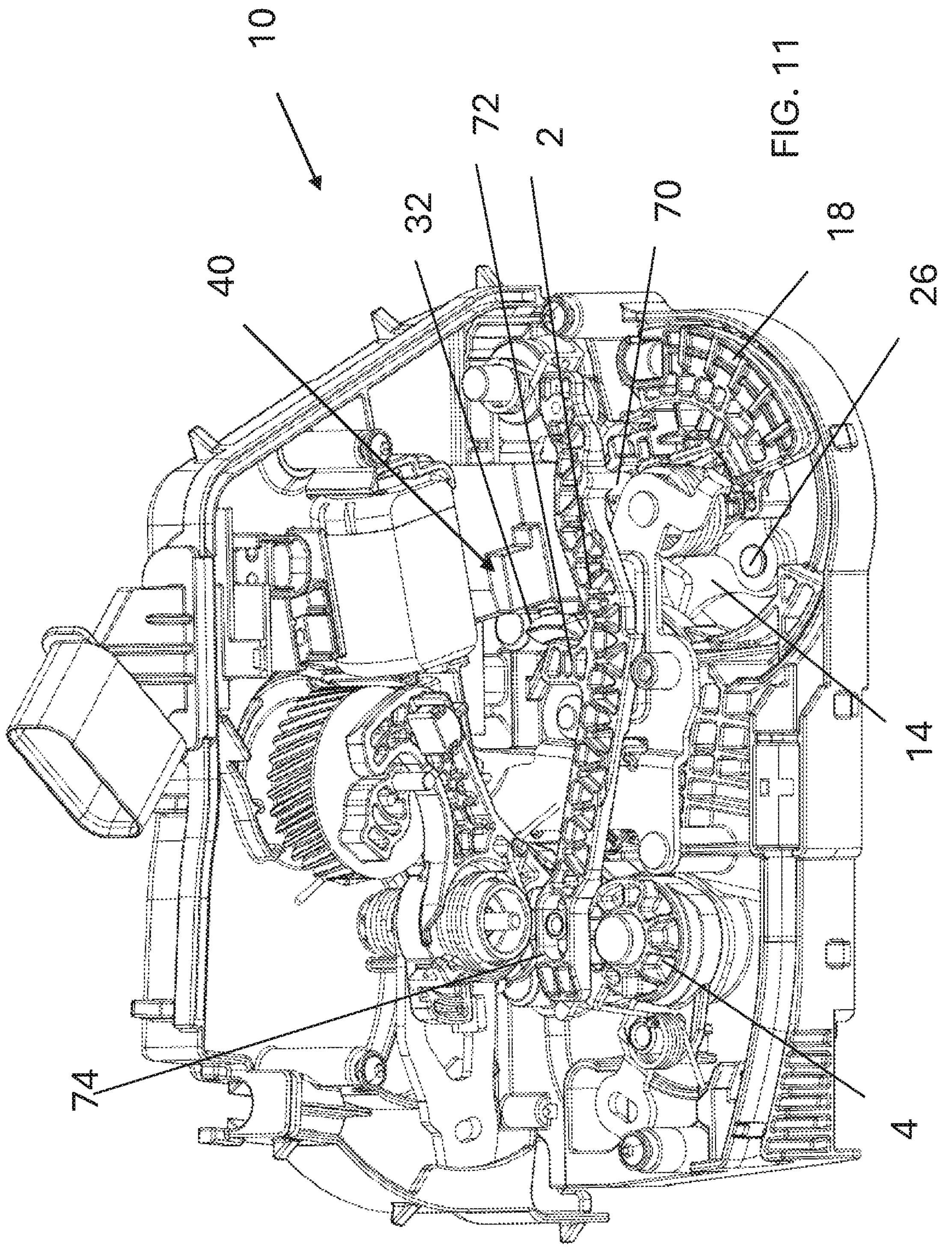
FIG. 11 illustrates components of a vehicle latch in accordance with the present disclosure.

Referring now to the attached FIGS., the internal cinching mechanism 40 of the latch 10 includes an overmolded cinching lever 18 that is rotatably mounted to the latch for rotation or movement about a pivot 16. The overmolded cinching lever 18 is capable of moving a cinch drive link 14 which is joined to a bearing 24 via a pivot 27. The bearing 24 will travel through a canal 9 of the cinch override lever 8 in order to maintain the course of the cinch drive link 14 that will move the claw 22 from a secondary to a primary position [See FIG. 1]. The former interaction will be possible via a remote cinch actuator 20 that will be connected through a cable 30 to the overmolded cinching lever 18 as depicted in FIG. 7. These cinching capabilities are controlled via the door ajar switch 32 that is integrated into an electrical circuit carrier (ECC) 36 [See FIG. 10]. When the vehicle sends the signal to the latch to start the cinching operation, the remote cinch actuator 20 starts to pull the cinch actuator cable 30, moving the cinching lever 18, therefore causing the cinch drive link 14 to start rotating on its pivot 26 and making contact with a claw blank 41 of the claw 22 causing the claw 22 to move from a secondary to a primary closed position.

Figure 5A:
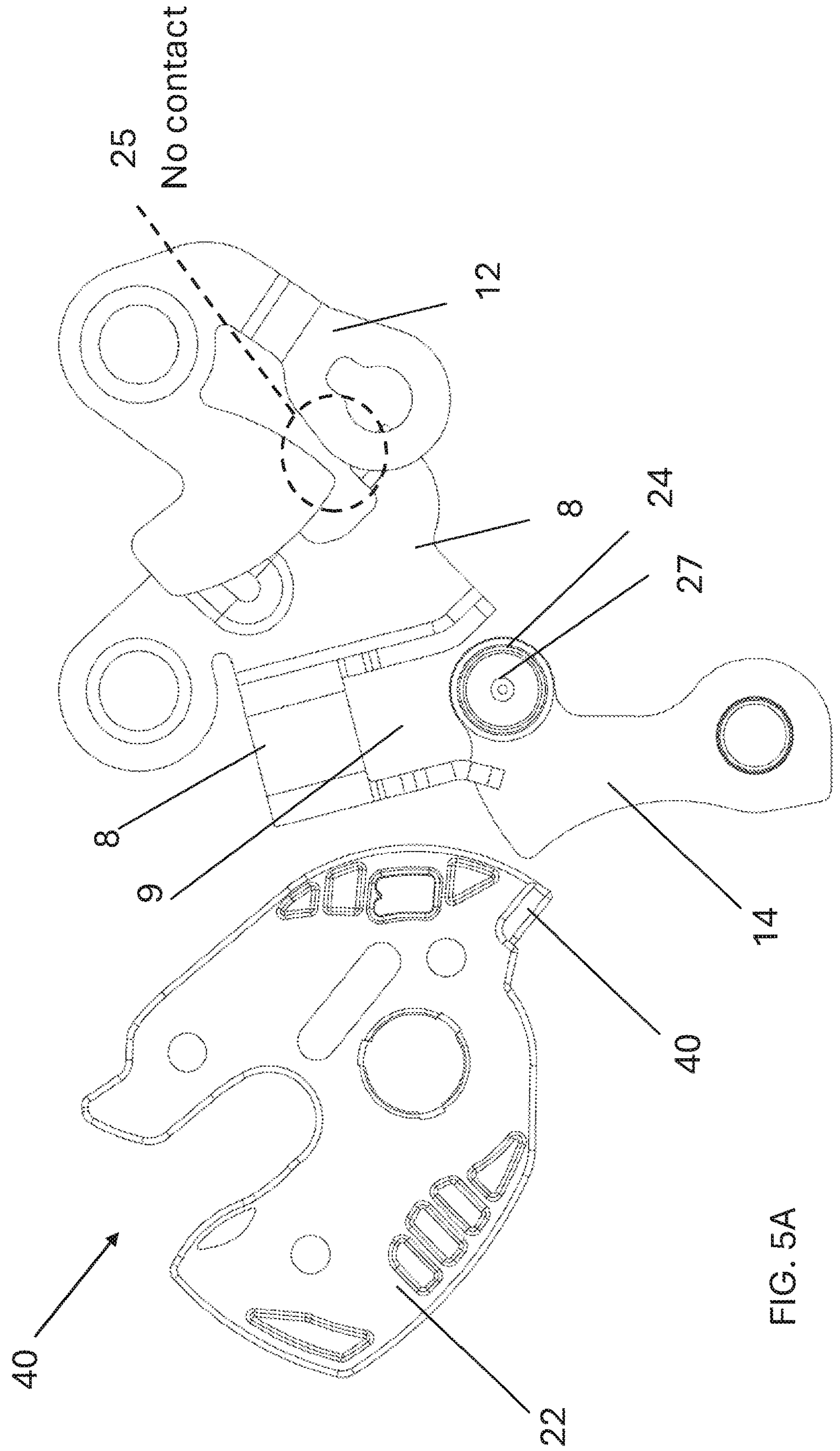
FIG. 5A illustrates a cinch drive link and a cinch override clutch lever when the latch is in an open position in accordance with the present disclosure.
Figure 5B:
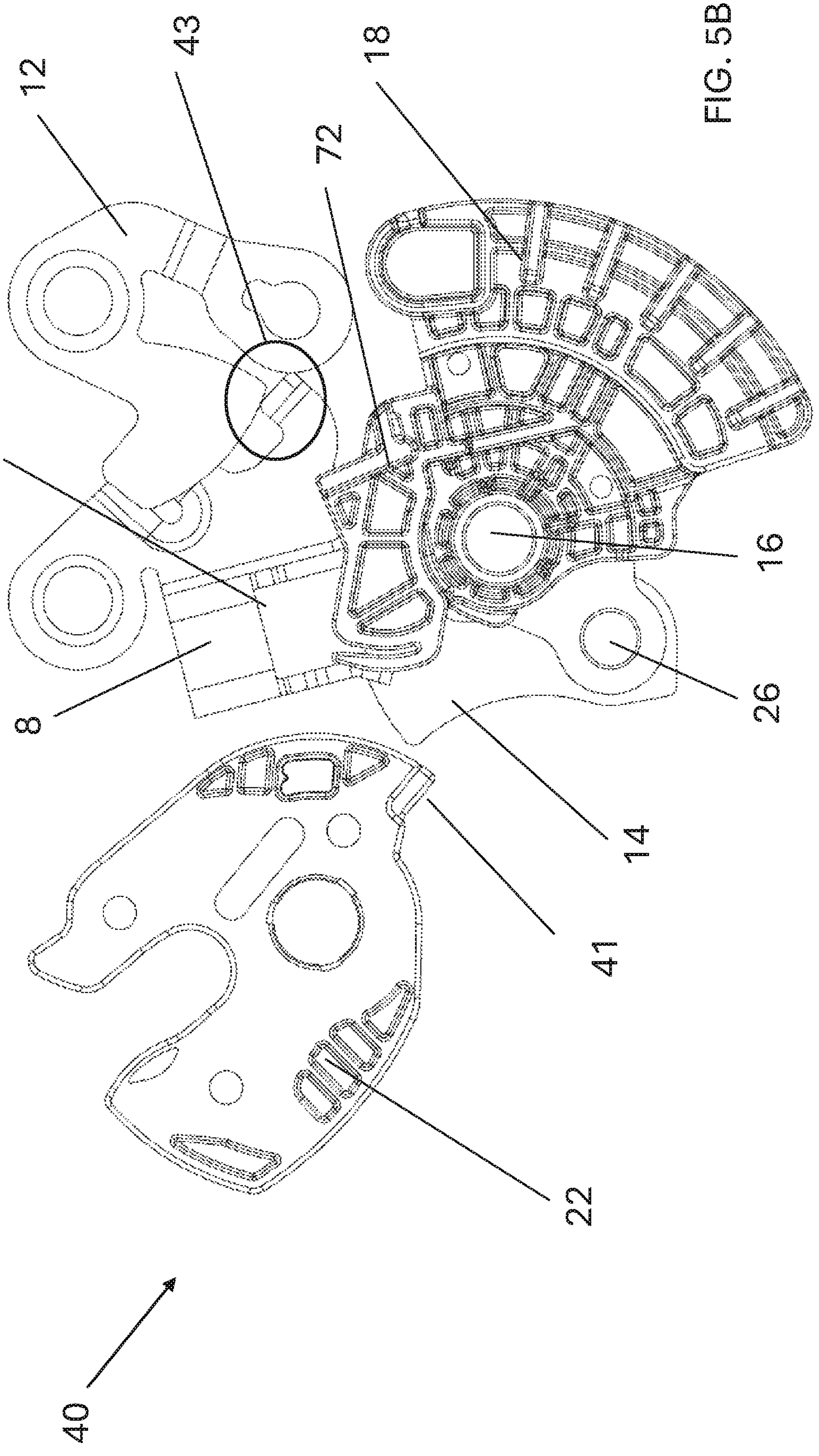
FIG. 5B illustrates a cinch drive link and a cinch override clutch lever when the latch is in an open position without an override an override clutch link in accordance with the present disclosure.

If the latch 10 is unable to fully reach its secondary position, but the door ajar switch 32 is compressed (e.g., a door rebound situation) the remote cinching actuator 20 would be activated, causing a non-desired function consisting of cinching while the latch 10 is in the open position [See FIGS. 5B]. See area 43 in FIG. 5B which shows undesired contact between the cinch override lever 8 and the cinch override clutch lever 12 when a cinch operation occurs when the claw 22 of the latch is in an open position. This interaction can occur during a cinching operation of the latch without an override clutch link 2 in accordance with the present disclosure. The activation of the remote cinching actuator 20 in this position could also potentially damage the claw 22 and its encapsulation.

Figure 4A:
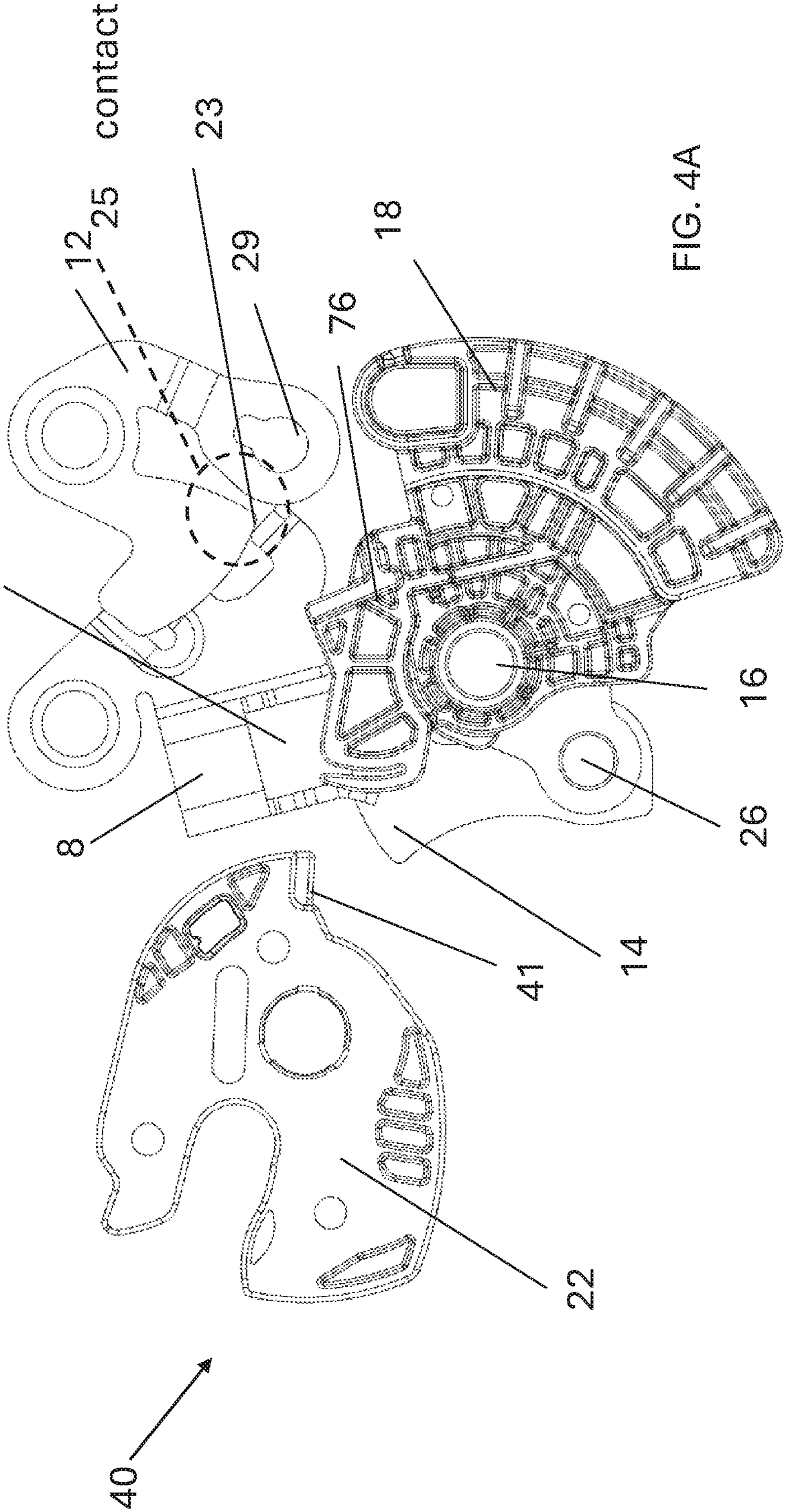
FIGS. 4A-4C illustrate the interaction and displacement between a cinch drive link and the claw when the latch is cinching in a secondary position.
Figure 4B:
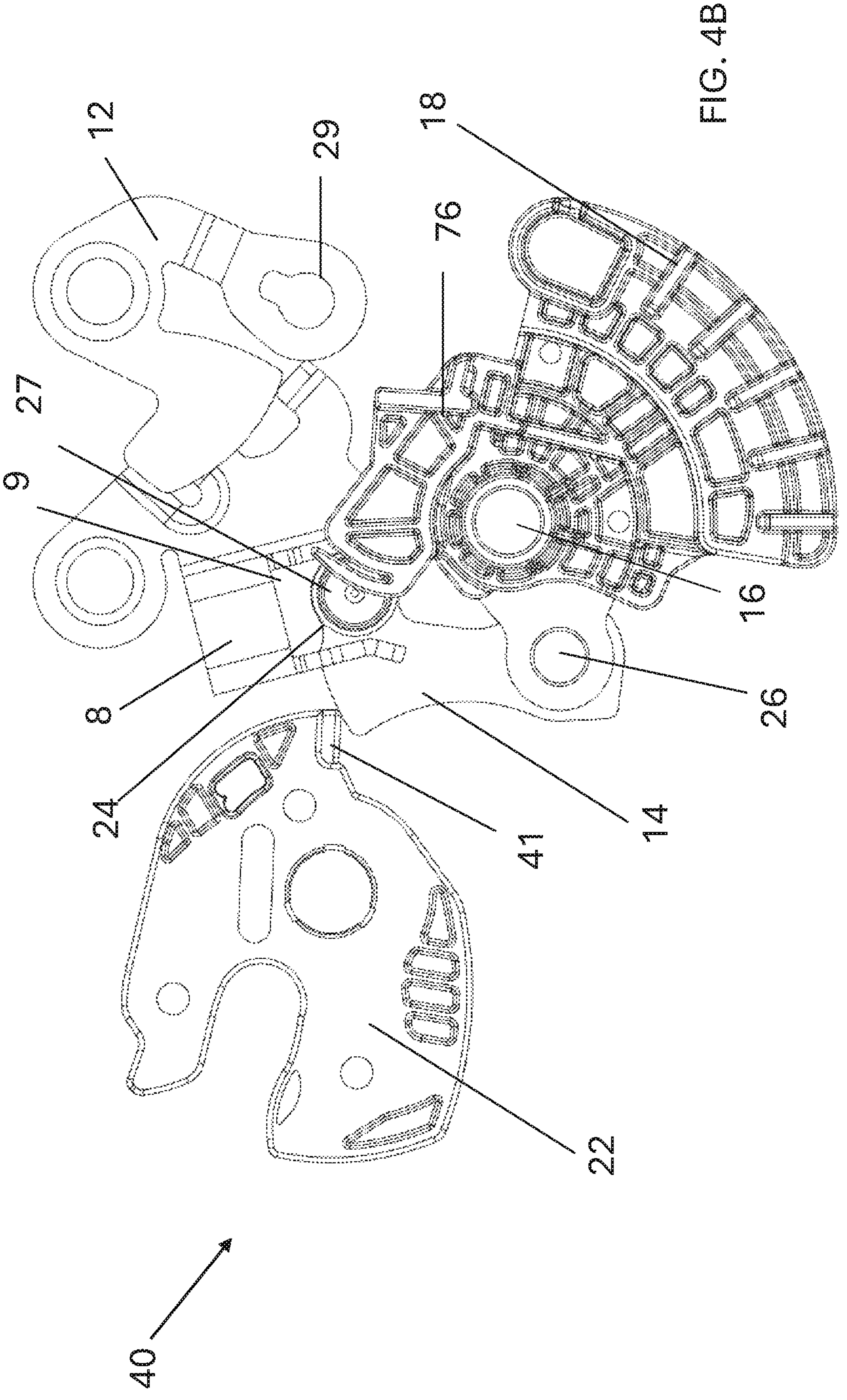
Figure 4C:
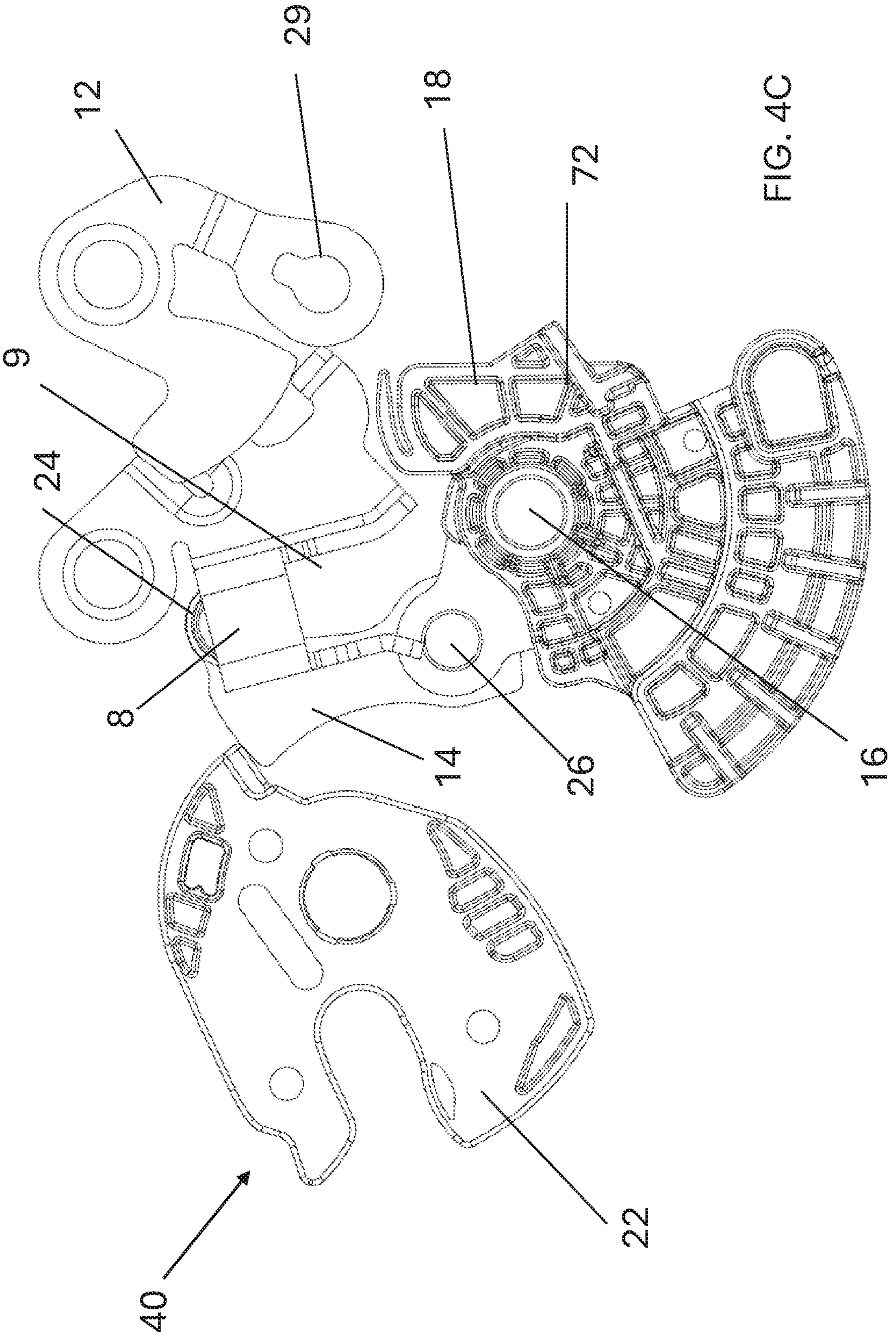

To prevent this issue from happening, the present disclosure allows the cinching mechanism 40 to always be on a bypass condition if the latch 10 is in the open position. As used herein the bypass condition of the cinching mechanism refers to rotation of the overmolded cinching lever 18 by cable 30 wherein the cinch drive link 14 does not make contact with the claw 22 when the claw 22 of the latch 10 is in the open position. This is done by disengaging the bite 23 between the override clutch lever 12 from the override lever 8. See area 25 in at least FIGS. 4A and 5A. When these levers are detached (override clutch lever 12 and override lever 8), the cinch drive link 14 which will travel along the canal 9 of the cinch override lever 8, will deviate its path from the cinching operation, causing it to bypass the claw 22 and avoid a contact between claw 22 and the cinch drive link 14.

Figure 2:
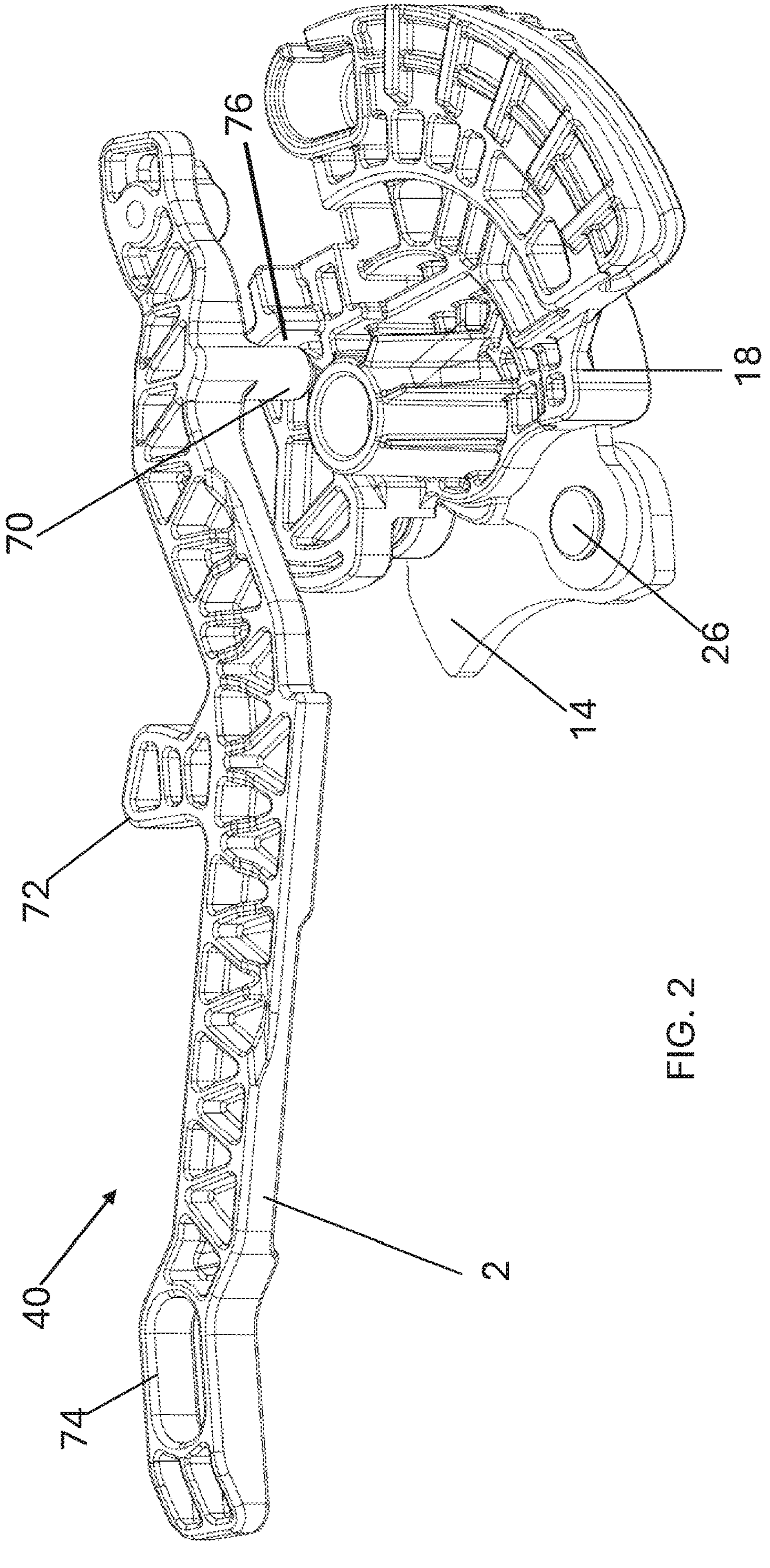
FIG. 2 is a perspective view of the interaction between an override clutch link and cinching lever of the present disclosure.
Figure 3A:
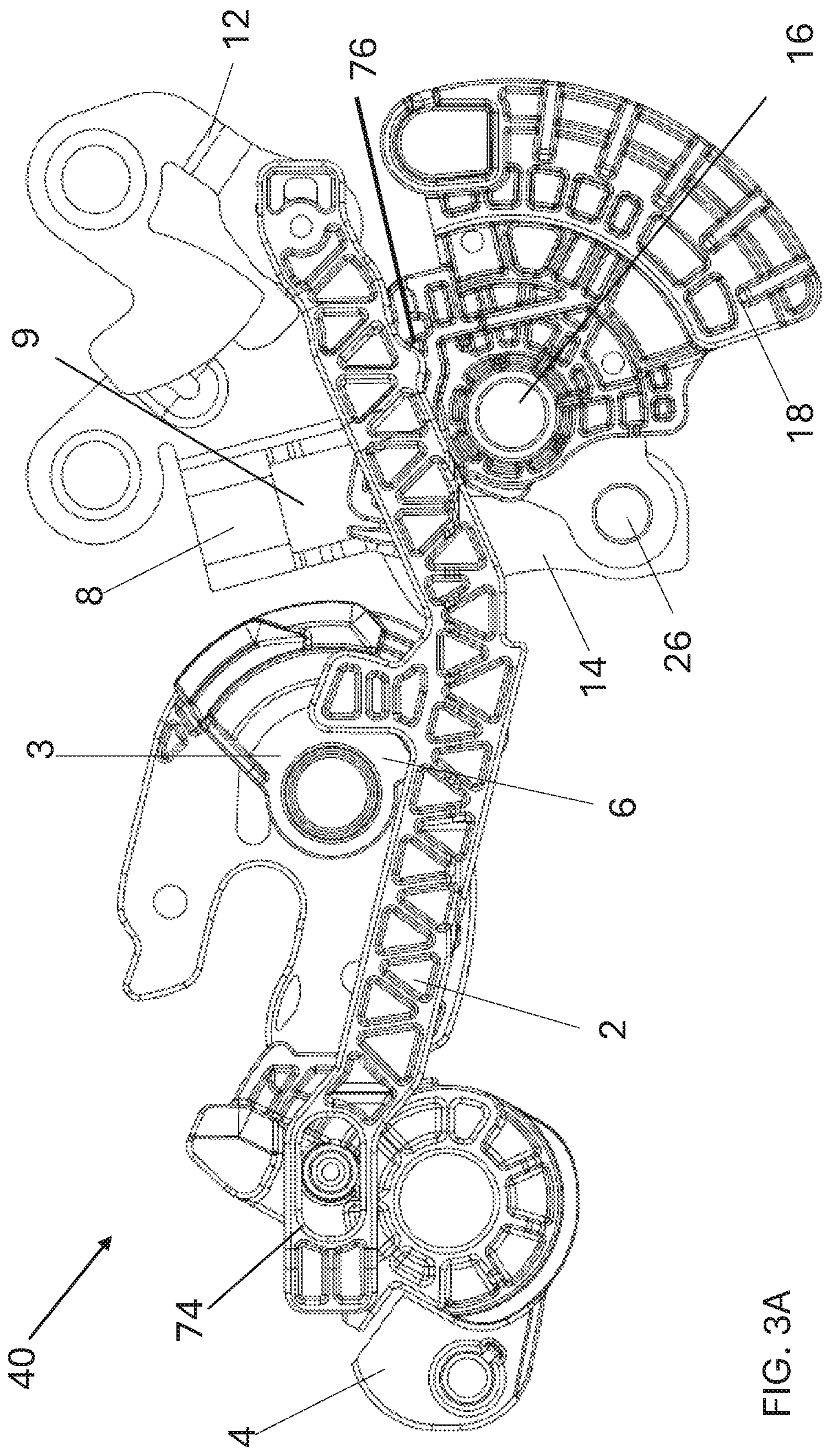
FIGS. 3A-3C illustrate the interaction and displacement between the override clutch link when a latch is cinching in a secondary position.
Figure 3B:
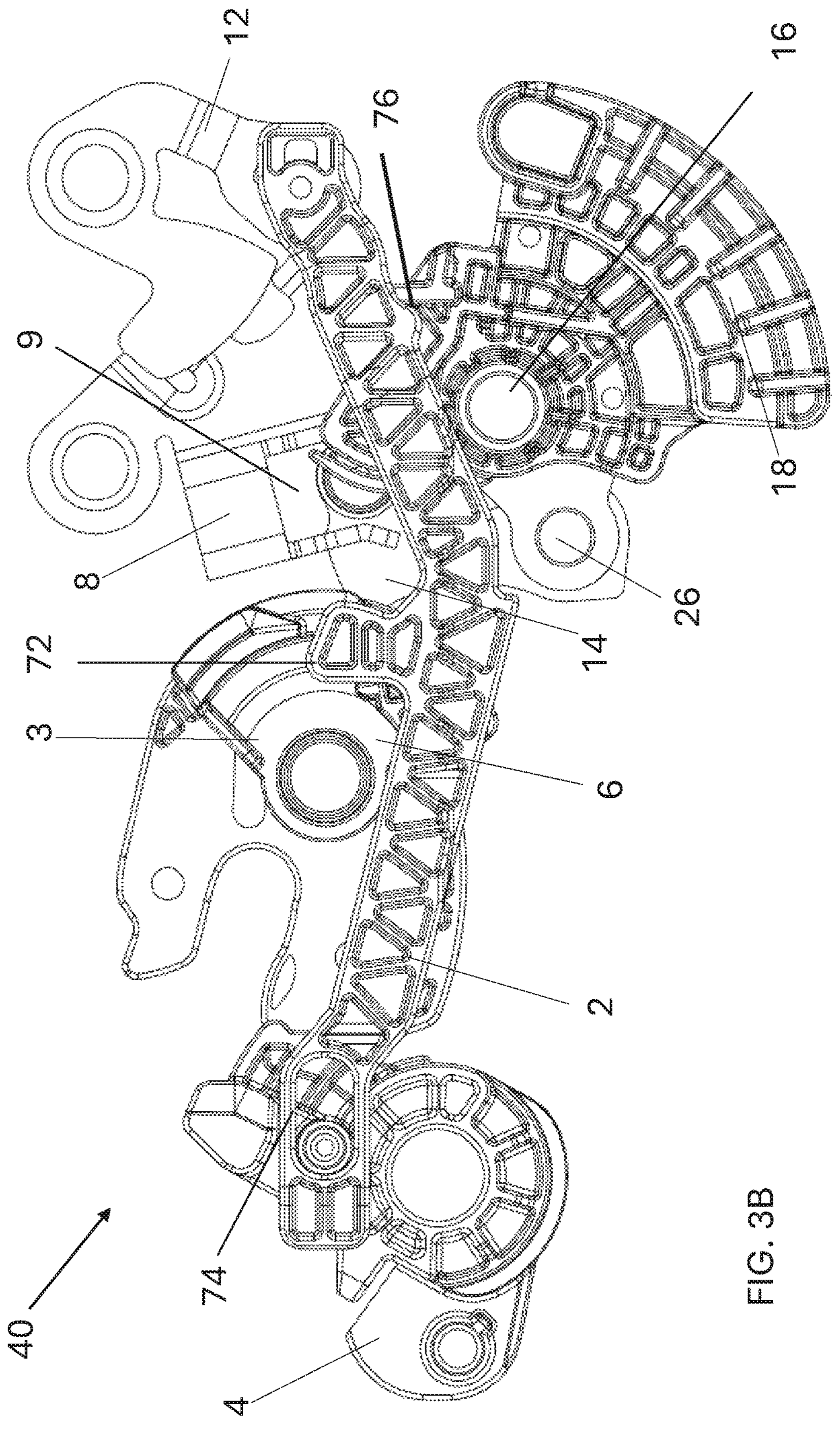
Figure 3C:
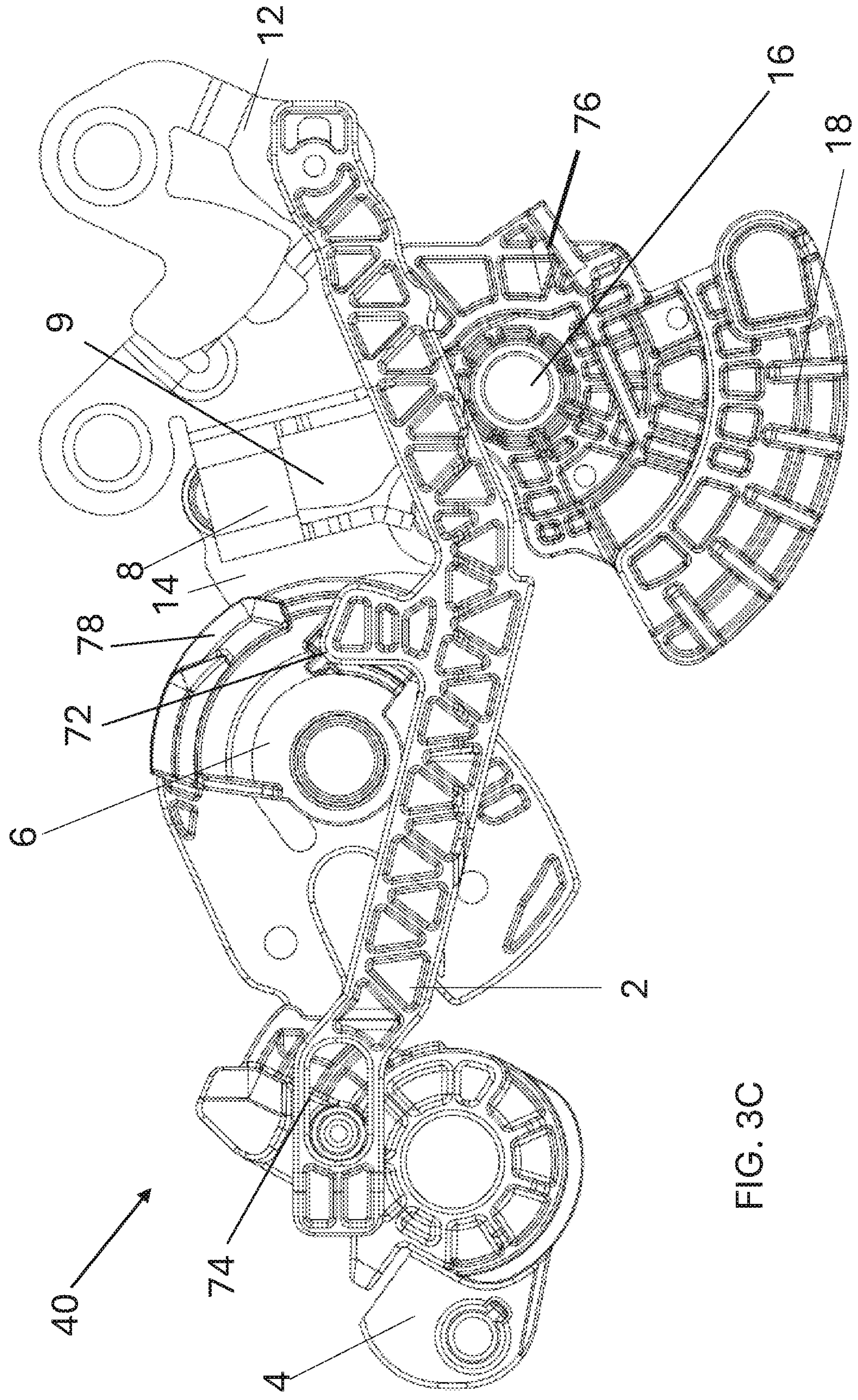
Figure 6:
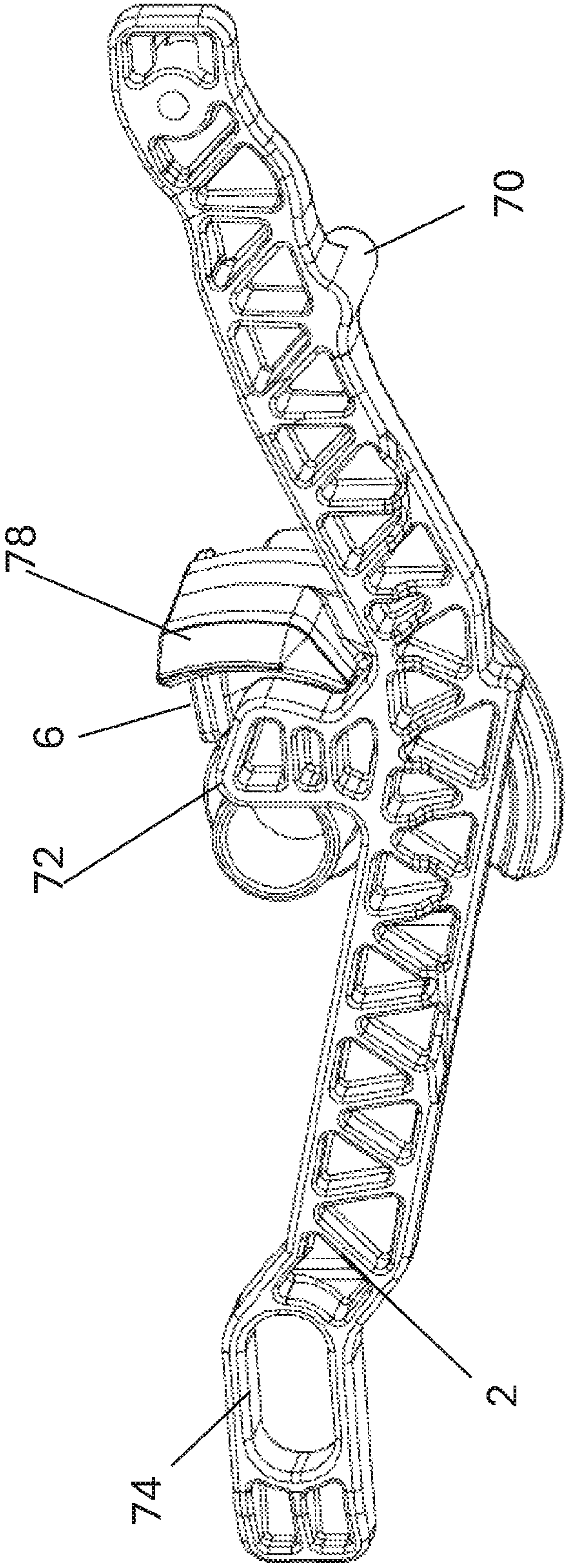
FIG. 6 is a perspective view of the interaction between the override clutch link and the cam door ajar when the latch is in the open position.

To achieve this, a post 70 located on the override clutch link 2 which will contact the cinch lever overmold 18, dictating a new position for the override mechanism (See FIG. 2). Also, a feature 72 added to the override clutch link 2 that will have direct contact with a portion 78 of the door ajar cam 6 will prevent the override clutch link 2 to move the override clutch lever 12 to an engage state whenever the latch 10 is in the open position [See FIG. 6]. The portion 78 of the door ajar cam 6 may be a wall of cam surface that extends upwardly from the door ajar cam 6. When the latch 10 is in a secondary position there is no longer a contact between feature 72 of the override clutch link 2 and the portion 78 of the door ajar cam 6. As such, the override clutch link 2 will follow the cinch lever overmold 18 while its performing the cinching operation until it contacts and reaches the pawl release lever 4 (See FIGS. 3A-3C), enabling a bite 23 between the override clutch lever 12 and the override lever 8, allowing the cinch drive link 14 to engage the claw blank 41 and reach a primary closed position of the latch 10.

As such, a robust cinching mechanism 40 internal to the latch 10, capable of allowing the cinching lever 18 to rotate freely and perform its cinching travel when the latch lies in an open state [FIG. 5A] while maintaining the integrity of the surrounding latch component and preventing the latch 10 from performing the cinching function which consists of pulling the door from a secondary position to a primary position.

The mechanism is comprised of a cinching lever 18 that over molds a cinch blank lever 48 attached by a pivot 26 to a cinch drive link 14 that interacts with the claw blank 41 to perform the cinching function. Furthermore, the cinch drive link 14 is also joined by another pivot 27 to a bearing 24 that travels through a canal 9 of an override lever 8 to permit the intended interaction between the claw blank 41 and the cinch drive link 14. Aside from the mentioned lever 8, the mechanism also includes an override clutch lever 12, which along with the override lever 8, performs the override function to stop the cinching operation from occurring.

The override lever 8 and the override clutch lever 12 maintain a bite condition 23 when the latch 10 is in the secondary state to allow the bearing 24 to travel through the canal 9 of the override lever 8, maintaining the cinch drive link 14 in its intended path to contact the claw blank 41, thus achieving the cinching function. However, when the latch 10 is in the open position, both levers (override lever 8 and the override clutch lever 12) bypass each other, thus limiting the interaction between the override lever 8 and the bearing 24, avoiding the contact between the claw blank 41 and the cinch drive link 14.

This is achieved mainly by two components: the override clutch link 2 and the cinching lever 18. The override clutch link 2 assembles directly on a pivot hole 29 of the override clutch lever 12, therefore, affecting the position of the override clutch lever 12. This component also assembles with the pawl release lever 4 through a slot 74 contained on the opposite side, making it critical for completing the override function. The override clutch link 2 includes a lateral tab 72 that interacts with the door ajar cam 6 to limit the movement of the override clutch lever 12 when the latch 10 is in the open position. Furthermore, the link 2 also includes a post 70 in the bottom area that interacts with the cinching lever 18, providing additional restraining on the override clutch lever 12 in the open position, but allowing it to return to its rest position when the latch is in the secondary state. The interaction between the override clutch link 2 and the cinching lever 18 is possible due to a retention feature 76 on the upper area of the cinching lever 18, which restricts the movement of the override clutch link 2. However, these features do not stop the cinching lever 18 from traveling in the open state of the latch 10, so that the cinching lever 18 is still capable of completing the cinching travel without affecting other components within the latch 10.

The cinching mechanism also includes an override pivot 42, a clutch pivot 44, and a cinching pivot 16 that holds the override lever 8, override clutch lever 12 and cinching lever 18 in position. It also includes a cinching spring 52 and an override clutch spring 46 which provide sufficient output to allow cinching lever 18 and override clutch lever 12 to return to their rest position. Moreover, the override lever 8 and override clutch lever 12 are assembled by their pivots 42, 44 to a reinforcement plate 50 that limits their vertical movement.

As such, an internal cinching mechanism 40 is provided. The internal cinching mechanism 40 includes a cinching lever 18 that over molds a cinching blank lever 48 which is attached by a pivot 26 to a cinch drive link 14. The cinch drive link 14 is furthermore joined to a bearing 24 that travels through a guiding feature or surface 11 of canal 9 of an override clutch lever 12 to allow an interaction between a claw blank 41 and a cinch drive link 14 to perform the cinching operation.

The internal cinching mechanism 40 controls the circumstances under which the cinching function will be performed by prohibiting the interaction between the cinch drive link 14 and a claw blank 41 from occurring during the open state of the latch 10 and only permitting the latch 10 to cinch from the secondary state.

This accomplished by the modification of the geometry of the override clutch link 2 since this component is critical for dictating the position of the override clutch lever 12. The override clutch link 2 was enhanced by the addition of a cam 72 for retention and engagement that will detain the override clutch link 2 from moving by interacting with the door ajar cam 6. Additionally, a post 70 located on the bottom part of the override clutch link 2 will serve as a further security to forbid the travel of the override clutch link 2 during the open state of the latch 10, while ensuring that it can still return to its rest position during the secondary state and thus help in creating an intended bite 23 between the override lever 8 and the override clutch 12 to allow the latch to draw the vehicle door from secondary to the primary closed position.

Moreover, the cinching lever 18 also plays a critical role in the accomplishment of the mentioned objective through the inclusion of a retention feature 76 in the upper area of the cinching lever 18 that aids in the interaction between the cinching lever 18 and the override clutch link 2. This new feature supports the link 2 in maintaining its intended position and in preventing an unsought interaction between the claw blank 41 and the cinch drive link 14. However, this feature does not deter the rotation of the cinching lever 18, thus allowing it to complete the cinching travel, even in the open state, without affecting the position or integrity of the surrounding components.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. Vehicle latch for a vehicle door, the vehicle latch:

a cinching mechanism internal to the vehicle latch, the cinching mechanism including:

a cinching lever operably coupled to an actuator via a cable, the cinching lever being rotatably mounted to the vehicle latch for movement about a pivot, the cinching lever being secured to a cinch blank lever, the cinch blank lever being pivotally mounted to a cinch drive link via a pivot;

a claw pivotally mounted to the vehicle latch for movement between an open position and a primary position, the cinch drive link being configured to contact a claw blank of the claw in order to move the claw into the primary position during a cinching operation of the vehicle latch;

a bearing secured to the cinch drive link via a pivot, the bearing travels through a canal of an override lever during interaction between the claw blank and the cinch drive link;

an override clutch lever;

a pawl release lever operably coupled to a pawl; and an override clutch link pivotally secured to the override clutch lever and the pawl release lever, wherein the override clutch link includes a lateral tab that interacts with a door ajar cam operably coupled to the claw of the vehicle latch in order to limit movement of the override clutch lever when the claw of the vehicle latch is in the open position, such as to prevent the cinch drive link from contacting the claw during cinching of the vehicle latch when the claw of the vehicle latch is in the open position.

2. The vehicle latch as in claim 1, wherein override clutch link includes a post that interacts with the cinching lever and provides restraint on the override clutch lever when the claw of the vehicle latch is in the open position.

3. The vehicle latch as in claim 1, wherein the override clutch link allows the override clutch lever to return to a rest position when the claw of the vehicle latch is in a secondary position.

4. The vehicle latch as in claim 2, wherein the post contacts a retention feature of the cinching lever when the claw of the vehicle latch is in the open position.

5. The vehicle latch as in claim 1, wherein the override lever contacts the override clutch lever when the claw is in a secondary position and the cinching lever is rotated by the actuator.

6. The vehicle latch as in claim 5, wherein override clutch link includes a post that interacts with the cinching lever and provides restraint on the override clutch lever when the claw of the vehicle latch is in the open position.

7. The vehicle latch as in claim 6, wherein the post contacts a retention feature of the cinching lever when the claw of the vehicle latch is in the open position.

8. The vehicle latch as in claim 7, wherein the override clutch link allows the override clutch lever to return to a rest position when the claw of the vehicle latch is in a secondary position.

9. The vehicle latch as in claim 5, wherein the override clutch link allows the override clutch lever to return to a rest position when the claw of the vehicle latch is in a secondary position.

10. The vehicle latch as in claim 1, wherein the bearing is rotatably secured to the pivot.

* * * * *